United States Patent
Kim et al.

(10) Patent No.: US 10,216,039 B2
(45) Date of Patent: Feb. 26, 2019

(54) BACKLIGHT UNIT AN DISPLAY DEVICE INCLUDING THE SAME

(71) Applicant: LG DISPLAY CO., LTD., Seoul (KR)

(72) Inventors: JunSik Kim, Seoul (KR); JooHong Lee, Seoul (KR); WoongKi Min, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/387,122

(22) Filed: Dec. 21, 2016

(65) Prior Publication Data

US 2017/0192305 A1      Jul. 6, 2017

(30) Foreign Application Priority Data

Dec. 30, 2015  (KR) .................. 10-2015-0189814

(51) Int. Cl.
  *G02F 1/1335*  (2006.01)
  *F21V 8/00*   (2006.01)

(52) U.S. Cl.
  CPC ....... *G02F 1/133615* (2013.01); *G02B 6/003* (2013.01); *G02B 6/0046* (2013.01);
  (Continued)

(58) Field of Classification Search
  CPC ......... G02F 1/133615; G02F 1/133553; G02B 6/003; G02B 6/0046; G02B 6/0051; G02B 6/0055; G02B 6/0096
  (Continued)

(56) References Cited

U.S. PATENT DOCUMENTS 5,258,896 A * 11/1993 Dreyer, Jr. ......... A61B 18/1206
                                                362/307
7,229,198 B2 * 6/2007 Sakai ................... G02B 6/0051
                                                362/225
(Continued)

FOREIGN PATENT DOCUMENTS

EP       2202447 A1    6/2010
EP       2461193 A2    6/2012
(Continued)

OTHER PUBLICATIONS

Office Action issued in European Patent Application No. 16205590.9 dated Dec. 3, 2018.

*Primary Examiner* — Bryon T Gyllstrom
(74) *Attorney, Agent, or Firm* — Birch, Stewart, Kolasch & Birch, LLP

(57) ABSTRACT

The present invention relates to a backlight unit of a display device. The backlight unit is structured to have no light guide plate, and can include a reflecting plate, which is arranged on the inner surface of a cover bottom, and which has a sloping surface, and a light-collecting lens, which collects light from an edge light source portion. A light-absorbing pattern is arranged on at least one of an optical sheet, a diffuser plate, and the reflecting plate using such a configuration that the density of arrangement of the light-absorbing pattern is largest on a light-input portion and decreases towards an anti-light-input portion, or using such a configuration that the light-absorbing pattern is formed only on a flat surface of the reflecting plate, near the light-input portion, thereby providing uniform light throughout the entire display panel.

12 Claims, 14 Drawing Sheets

(52) U.S. Cl.
CPC ......... *G02B 6/0051* (2013.01); *G02B 6/0055* (2013.01); *G02B 6/0096* (2013.01); *G02F 1/133504* (2013.01); *G02F 1/133553* (2013.01)

(58) Field of Classification Search
USPC ........................................................ 362/97.1
See application file for complete search history.

(56) References Cited

U.S. PATENT DOCUMENTS

| | | | | | |
|---|---|---|---|---|---|
| 7,287,892 | B1* | 10/2007 | Pang | .................... | G02B 6/0021 362/560 |
| 2007/0013624 | A1* | 1/2007 | Bourhill | ................ | B82Y 20/00 345/84 |
| 2009/0190072 | A1* | 7/2009 | Nagata | ................ | G02B 6/0028 349/96 |
| 2010/0103346 | A1* | 4/2010 | Ajichi | .................. | G02B 6/0035 349/62 |
| 2010/0296270 | A1* | 11/2010 | Gomi | ................ | G02F 1/133605 362/97.3 |
| 2011/0007506 | A1* | 1/2011 | Kinoshita | ............ | G02B 6/0096 362/235 |
| 2011/0157914 | A1* | 6/2011 | Chang | .................. | G02B 6/0096 362/609 |
| 2012/0229727 | A1* | 9/2012 | Murata | ................ | G02B 6/0096 349/61 |
| 2013/0063964 | A1* | 3/2013 | Meir | .................... | G02B 6/005 362/555 |
| 2017/0192305 | A1* | 7/2017 | Kim | .................. | G02F 1/133504 |

FOREIGN PATENT DOCUMENTS

| | | |
|---|---|---|
| JP | 7-72815 A | 3/1995 |
| JP | 2000-162595 A | 6/2000 |
| JP | 2001-52514 A | 2/2001 |
| JP | 2010-108900 A | 5/2010 |
| TW | 200817777 A | 4/2008 |
| TW | 201219925 A1 | 5/2012 |

* cited by examiner

220(light source unit)

BACKLIGHT UNIT AN DISPLAY DEVICE INCLUDING THE SAME

CROSS-REFERENCE TO RELATED APPLICATION

This application claims priority from Korean Patent Application No. 10-2015-0189814, filed on Dec. 30, 2015, which is hereby incorporated by reference for all purposes as if fully set forth herein.

BACKGROUND OF THE INVENTION

Field of the Invention

The present invention relates to a backlight unit and a display device and, more particularly, to a backlight unit, which is structured to have no light guide plate, and a display device including the backlight unit.

Description of the Background Art

Development of information-oriented societies has increased various types of demands for display devices for displaying images, and various display devices have recently been utilized, such as an LCD (Liquid Crystal Display), a PDP (Plasma Display Panel), and an OLED (Organic Light Emitting Diode) display.

Among such display devices, the LCD generally includes an array substrate including a thin-film transistor, which is a switching element for on/off control of each pixel area; an upper substrate including a color filter and/or a black matrix; a display panel including a liquid crystal material layer formed therebetween; a driving unit for controlling the thin-film transistor; and a back light unit (BLU) for providing light to the display panel, wherein the state of arrangement of a liquid crystal layer is adjusted according to an electric field applied between a pixel (PXL) electrode provided in the pixel area and a common voltage (Vcom) electrode, and the transmittance of light is adjusted accordingly, thereby displaying images.

Such a liquid crystal display device includes a backlight unit for providing the display panel with light, and backlight units are classified into edge types and direct types according to the arrangement of light sources and the type of transfer of light.

The edge-type backlight unit may include a light source module or a light source device, which includes a light source such as an LED, a holder or a housing for fixing the light source, a light source driving circuit, and the like, and which is arranged on one side of a display device; a light guide plate (LGP) for diffusing light throughout the entire panel area; a reflecting plate for reflecting light towards the display panel; and at least one optical sheet arranged on the upper portion of the light guide plate for the purpose of improvement of luminance, diffusion of light, and protection.

Among the components that constitute the edge-type backlight unit, the light guide plate (LGP) is a plate-shaped member for uniformly guiding light, which is from the light source, throughout the entire display device, and may have a predetermined pattern formed on at least one surface of the plate-shaped member, for the purpose of uniform distribution of light and the like.

Such a light guide plate is made of a light-transmitting plastic material, such as polymethyl methacrylate (PMMA), and thus has a high degree of light transmittance. However, the fact that the light guide plate needs to have at least a predetermined thickness, in order to maintain constant rigidity and the like, has become an obstacle to the slimness of the entire display device.

Furthermore, the light guide plate made of a plastic material has a problem in that, due to the large thermal expansion ratio and the high degree of moisture swelling, there is a restriction on the arrangement in connection with the light source portion, and an additional support structure is needed.

On the other hand, the direct-type backlight unit has a problem in that, although no light guide plate is used, a light-diffusing lens needs to be used for the light source portion, and the fact that a constant optical gap needs to be maintained between the light source portion and the diffuser plate becomes an obstacle to the slimness of the display device.

Therefore, a scheme to replace the light guide plate of the edge-type backlight unit may be required.

SUMMARY OF THE INVENTION

An aspect of the present invention is to provide an edge-type backlight unit, which is structured to have no light guide plate, and a display device including the same.

Another aspect of the present invention is to provide a backlight unit including a reflecting plate, which is arranged on the inner surface of a cover bottom, and which has a sloping surface, and a light-collecting lens for collecting light from an edge light source portion, thereby having a slim structure with no light guide plate.

Another aspect of the present invention is to provide an LGP-less backlight unit including a reflecting plate, which is arranged on the inner surface of a cover bottom, and which has a sloping surface, and a light-collecting lens for collecting light from an edge light source portion, wherein a light-absorbing pattern is arranged on at least one of an optical sheet, a diffuser plate, and the reflecting plate such that uniform light can be provided throughout the entire display panel.

Another aspect of the present invention is to provide an LGP-less backlight unit, which has the above structure, wherein a light-absorbing pattern is arranged on at least one of an optical sheet, a diffuser plate, and the reflecting plate using such a configuration that the density of arrangement of the light-absorbing pattern is largest on a light-input portion and decreases towards an anti-light-input portion, or using such a configuration that the light-absorbing pattern is formed only on a flat surface of the reflecting plate, near the light-input portion, thereby providing uniform light throughout the entire display panel.

According to an embodiment of the present invention, there is provided a display device including a display panel; a light source unit including a light source PCB mounted on at least one side of the display device, a light source portion mounted on the light source PCB, and a bar-type light-collecting lens configured to reduce a directing angle of light, which is incident from the light source portion, and to collect the light; a cover bottom supporting a rear surface of the display panel; a reflecting plate mounted on an inner surface of the cover bottom, the reflecting plate having a flat surface, which is parallel with the display panel, and a sloping surface, which slopes with regard to the flat surface; a diffuser plate arranged to be spaced from the reflecting plate in parallel with the display panel; and an optical sheet portion arranged on the diffuser plate.

According to another embodiment of the present invention, there is provided a backlight unit including a light source unit including a light source PCB mounted in an edge type, a light source portion mounted on the light source PCB so as to provide light to a display panel, and a bar-type light-collecting lens configured to reduce a directing angle of light, which is incident from the light source portion, and to collect the light; a reflecting plate mounted on an inner surface of a cover bottom, which supports a rear surface of the display panel, the reflecting plate having a flat surface, which is parallel with the display panel, and a sloping surface, which slopes with regard to the flat surface; a diffuser plate arranged to be spaced from the reflecting plate in parallel with the display panel; and an optical sheet portion arranged on the diffuser plate.

According to embodiments of the present invention to be described below, it is possible to provide a backlight unit including a reflecting plate, which is arranged on the inner surface of a cover bottom, and which has a sloping surface, and a light-collecting lens, which collects light from an edge light source portion, thereby having a slim structure with no light guide plate.

Particularly, it is possible to advantageously provide an LGP-less backlight unit, which has the above structure, wherein a light-absorbing pattern is arranged on at least one of an optical sheet, a diffuser plate, and the reflecting plate using such a configuration that the density of arrangement of the light-absorbing pattern is largest on a light-input portion and decreases towards an anti-light-input portion, or using such a configuration that the light-absorbing pattern is formed only on a flat surface of the reflecting plate, near the light-input portion, thereby providing uniform light throughout the entire display panel.

BRIEF DESCRIPTION OF THE DRAWINGS

The above and other objects, features and advantages of the present invention will be more apparent from the following detailed description taken in conjunction with the accompanying drawings, in which:

FIG. 1A illustrates an edge-type backlight unit, and FIG. 1B illustrates a direct-type backlight unit, to which the present invention is applicable;

DETAILED DESCRIPTION OF THE EMBODIMENTS

Figure 1A:
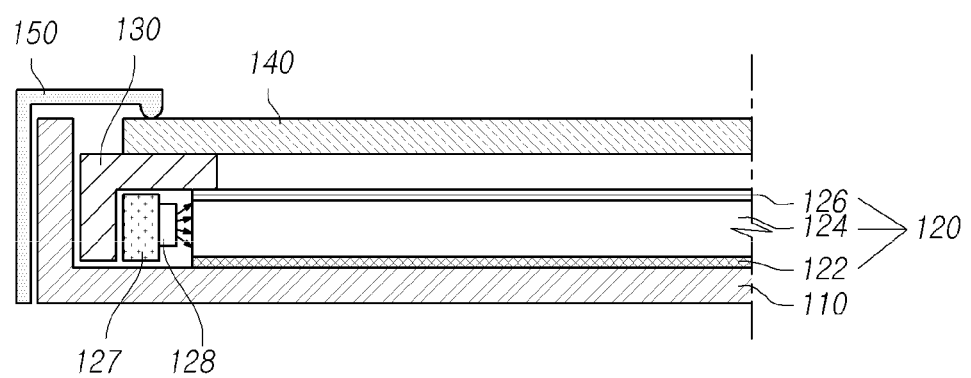
FIGS. 1A and 1B illustrate sectional views of two types of general backlight units, where

Hereinafter, embodiments of the present invention will be described with reference to the accompanying drawings. In designating elements of the drawings by reference numerals, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

Figure 1B:
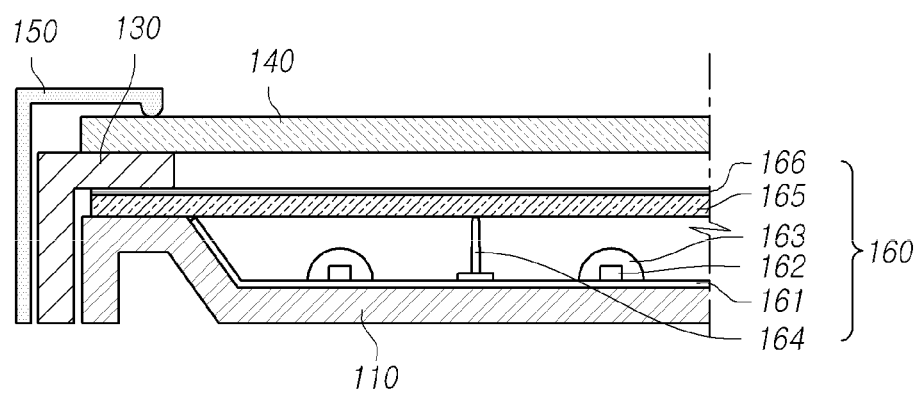

FIGS. 1A and 1B illustrate sectional views of two types of general backlight units, where FIG. 1A illustrates an edge-type backlight unit, and FIG. 1B illustrates a direct-type backlight unit, to which the present invention is applicable.

As illustrated in FIGS. 1A and 1B, a display device, to which an embodiment of the present invention is applicable, includes a display panel 140 such as a liquid crystal display panel; a backlight unit 120, 160 arranged on the lower portion thereof so as to emit light to the display panel; and a cover bottom 110, which supports the backlight unit, which extends throughout the entire rear surface of the display device, and which is made of a metallic or plastic material.

In addition, the liquid crystal display device may further include a guide panel 130 for supporting a light source housing 127, which constitutes the backlight unit, on a side surface thereof and supporting the display panel 140 on the upper portion thereof; a case top 150, which surrounds a side surface of the cover bottom or the guide panel, and which is arranged to extend up to a part of the front portion of the display panel; and the like.

Such a liquid crystal display device includes a backlight unit for providing the display panel with light, and backlight units can be classified into edge types and direct types according to the arrangement of light sources and the type of delivery of light.

It is the edge-type backlight units, among the above backlight units, to which the present invention is applicable.

As illustrated in FIG. 1A, an edge-type backlight unit, to which the present invention is applicable, may include a light source module 127, which includes a light source 128 such as an LED, a holder or a housing for fixing the light source, a light source driving circuit, and the like, and which is arranged on one side of the display device; a light guide plate (LGP) 124 for diffusing light throughout the entire panel area; a reflecting plate 122 for reflecting light towards the display panel; at least one optical sheet 126 arranged on the upper portion of the light guide plate for the purpose of improvement of luminance, diffusion of light, and protection; and the like.

In such an edge-type backlight unit, light from the light source is incident to a light guide plate introduction unit, undergoes total reflection at the light guide plate, diffuses towards the front surface of the display device, and exits towards the display panel.

On the other hand, the direct-type backlight unit, as illustrated in FIG. 1B, may include a light source PCB 161, which is arranged on the upper portion of a cover bottom 110; a diffuser plate 165, which is arranged to be spaced from the upper portion of the light source PCB by a predetermined distance, and which diffuses light from the light source; and at least one optical sheet 166 arranged on the upper portion of the diffuser plate. Multiple diffuser plate supports (DPS) 164 are arranged on the light source PCB 161 in order to prevent the diffuser plate from sagging.

The light source PCB 161 is arranged throughout the entire front surface of the display device, and includes, on the upper portion thereof, LED chips 162, which are multiple light sources, a light-diffusing lens 163 for diffusing light from respective light sources, and the like.

On the other hand, the direct-type backlight unit may be advantageous in that direct emission of light from the multiple light sources, which are arranged on the front surface of the display device, to the display panel enables high luminance, lowers the manufacturing cost, and facilitates local dimming implementation; however, the interval between the light sources and the diffuser plate, i.e., optical gap (OG), needs to have at least a predetermined value such that light from multiple point light sources, i.e., LEDs, can sufficiently diffuse towards the display panel; as a result, the thickness may be relatively large.

In contrast, the edge-type backlight unit, to which the present invention is applicable, may be advantageous in that the same can be as slim as 10 mm or less because only a space corresponding to the thickness of the light guide plate is needed.

However, light guide plates used for general edge-type backlight units are made of a light-transmitting plastic material, such as polymethyl methacrylate (PMMA), and thus have a high degree of light transmittance, but may occupy at least a predetermined space in order to maintain a constant level of rigidity and the like.

Furthermore, the light guide plate made of a plastic material has a problem in that, due to the large thermal expansion ratio and the high degree of moisture swelling, there is a restriction on arrangement in connection with the light source portion, and an additional support structure may be needed.

Accordingly, the present invention seeks to provide an edge-type backlight unit, which is structured to have no light guide plate and, particularly, seeks to provide a technology for forming a light-absorbing pattern on a surface of a diffuser plate, an optical sheet, or a reflecting plate so as to have a uniform light distribution throughout the entire display device.

Figure 2:
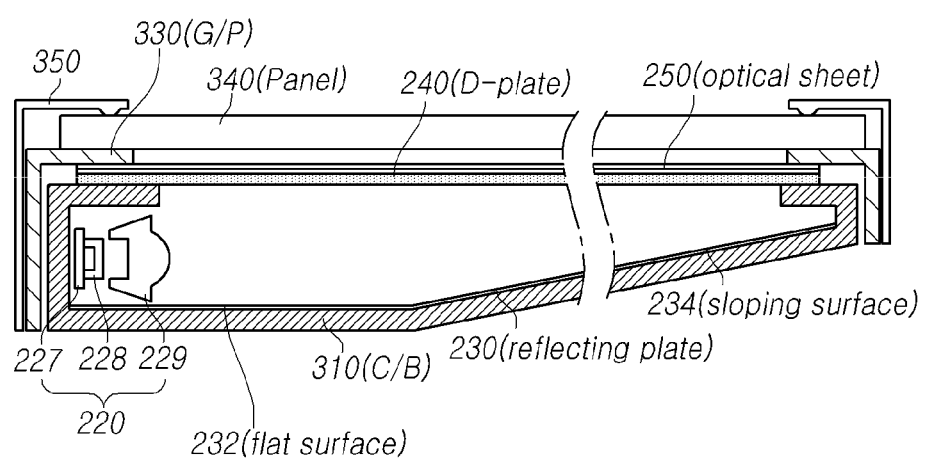
FIG. 2 is a sectional view of a display device including a backlight unit according to an embodiment of the present invention.

FIG. 2 is a sectional view of a display device including a backlight unit according to an embodiment of the present invention. All the components of the backlight unit as well as the display device having that backlight unit according to all embodiments of the present invention are operatively coupled and configured.

Referring to FIG. 2, the display device according to an embodiment of the present invention largely includes a display panel 340, a cover bottom 310 that supports a light source unit 220 and a diffuser plate 240 of the backlight unit, a guide panel 330 that supports the bottom surface of the display panel, and the like.

The backlight unit according to the embodiment of the present invention is structured to have no light guide plate, and may include a light source unit 220 including a light source PCB 227 mounted on at least one side of the display device, a light source portion 228 mounted on the light source PCB, and a light-collecting lens 229 arranged in front of a light source chip in order to reduce the directing angle of light, which is incident from the light source portion, and then to collect the light; a reflecting plate 230 for reflecting the light from the light source unit towards the front surface of the display panel; a diffuser plate 240 arranged to be spaced from the reflecting plate and to diffuse light from the reflecting plate; an optical sheet portion 250 arranged on the upper portion of the diffuser plate; and the like.

Particularly, the reflecting plate 230 according to the present embodiment is a plate-shaped member attached to the inner surface of the cover bottom, and has a flat surface 232 that extends from a light-input portion, on which the light source unit is arranged, in parallel with the display panel over a predetermined area and a sloping surface 234 that extends at a predetermined sloping angle with regard to the flat surface.

The cover bottom 310 is a support structure that supports the rear surface of the display device. Particularly, the cover bottom 310 is a wedge-type support structure having a bent portion formed on a side surface thereof so as to have a U-shaped section, and having a flat portion 312 and a sloping portion 314 on the rear surface thereof so as to correspond to the flat surface 232 and the sloping surface 234 of the reflecting plate, respectively.

It could be understood that, although it is assumed in the description of the present embodiment that the cover bottom and the reflecting plate are separate members, it is possible, in some cases, to coat or deposit a reflecting material inside the rear surface of the cover bottom, thereby replacing the reflecting plate.

As will be described later in more detail, the sloping surface 234 of the reflecting plate 230 is provided to increase the amount of light that is directed from the anti-light-input portion towards the display panel (front).

In addition, it is preferred that the flat surface of the reflecting plate is arranged on a light-input portion adjacent to the light source unit, the sloping surface of the reflecting plate is arranged on an anti-light-input portion that is spaced from the light source unit, and the length D2 of the flat surface corresponds to 40-55% of the entire length D1 of the reflecting plate.

Figure 3A:
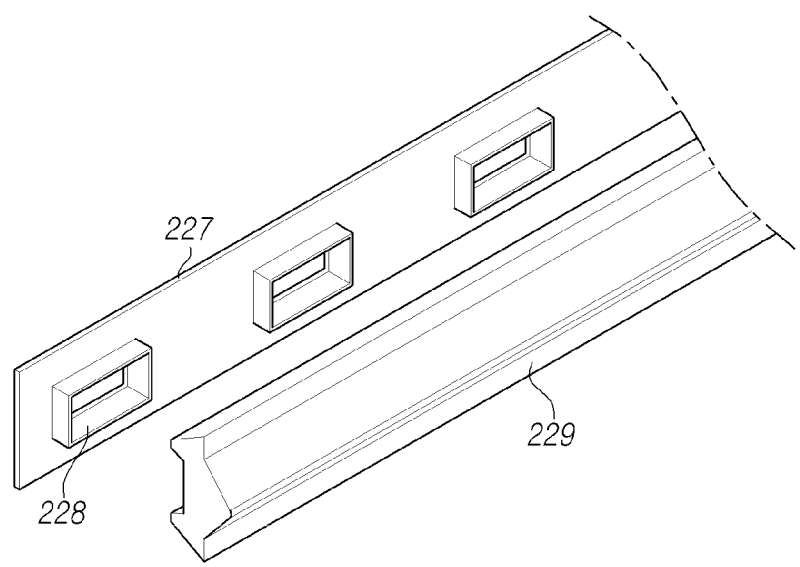
FIG. 3A to FIG. 3C illustrate the configuration of an example of a bar-type light-collecting lens and a light source unit of FIG. 2.
Figure 3B:
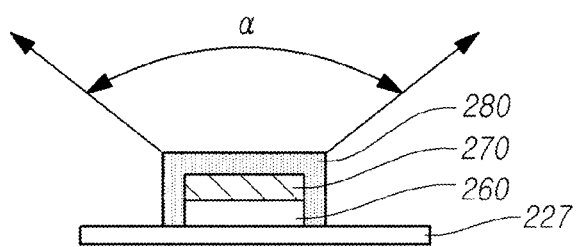
Figure 3C:
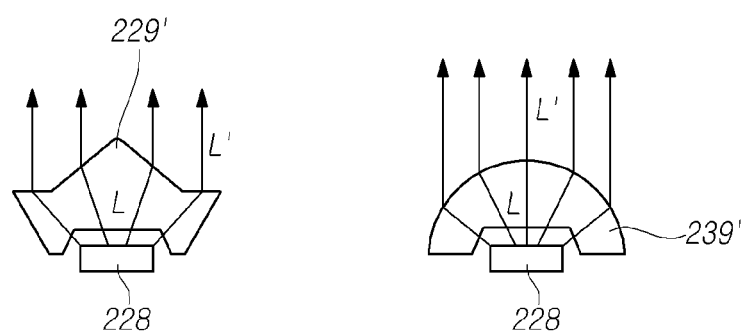

FIG. 3A to FIG. 3C illustrate the configuration of a bar-type light-collecting lens, which is used in the embodiment of FIG. 2, and a light source unit including the same.

Referring to FIGS. 3A to 3C, the light source unit 220 according to the present embodiment includes a light source PCB 227, which is mounted on at least one side of the display device, a light source portion 228 mounted on the light source PCB, and a light-collecting lens 229 arranged in front of the light source chip in order to reduce the directing angle of light, which is incident from the light source portion, and then to collect the light.

The light source PCB 227 is a long bar-type printed circuit board (PCB), which has a circuit element needed to drive the light source chip and the like formed thereon, and may be arranged on at least one of four sides of the display device, more particularly, on the lower side of the display device.

It will be assumed, for convenience of description, in the present specification that the set device, for which a display device is used, and which is an electronic device, is a TV, and the lower portion, when the TV has been normally installed, is the lower portion of the display device. However, the present invention is not limited to this example and other variations are possible.

In connection with the section of the display device, furthermore, the direction in which images are displayed, i.e., the direction towards the display panel 340, is defined as the front or forward; the opposite direction is indicated as a rear surface/bottom surface or the rear; one side of both side surfaces, on which the light source unit is arranged, is described as the light-input portion; and the opposite side is described as the anti-light-input portion.

The light source portion 228 used for the light source unit may be configured as a light source package including a light source chip, such as an LED chip, and a support structure that supports the light source chip.

More particularly, the light source portion 228 may be such a type of LED package that an LED chip is directly formed on a substrate, without either a mold frame or a lead frame, by a surface mount technology (SMT).

As illustrated in FIG. 3B, the light source portion 228 used for the present embodiment is a light source package referred to as a so-called chip-on-board (COB) or a chip scale package (CSP), and is structured such that a light-emitting portion 260, which includes two electrode layers and a light-emitting layer arranged therebetween, is formed on a growth substrate layer 270, which has a light-transmitting property, and a fluorescent sealing layer 280 is formed around the same.

The light source chip (LED chip) used for the light source package according to FIG. 3B is referred to as a flip-chip, and is characterized in that blue light, which has been generated from the light-emitting layer, is converted to and emitted as white light, as passing through the growth substrate layer 270 and the fluorescent sealing layer 280, and light is also emitted in the lateral direction of the LED chip.

It could be understood that the light source portion 228 according to the present embodiment is not limited to such a light source package that uses a flip-chip, and may also be a mold-type light source package including a blue LED chip, a mold structure that supports the periphery thereof, and a lead frame that has an electrode and the like formed thereon.

The LED chip of the light source portion 228 may be a blue LED chip, which is arranged between two electrodes and emits blue light, and the emitted blue light is converted by an optical conversion sealing portion 280 into light such as R, G, Y, and white light is finally discharged.

The light emitted from the light source portion 228 normally has a directing angle α or a diffusing angle of at least 120°; in the case of a backlight unit having a conventional structure, as illustrated in FIG. 1A, light is incident on the light guide plate and is diffused/propagated by the light guide plate, posing no problem; in the case of the structure according to the present embodiment, which has no light guide plate, a bar-type light-collecting lens 229 is used to convert light, which has a large directing angle, to straightly traveling light.

As illustrated in FIGS. 3B and 3C, the light-collecting lens 229 according to the present embodiment is a long bar-type optical lens arranged in front of the light source portion, and has the function of converting the path of light, which has been emitted from the light source portion 228, and which has a wide directing angle α, such that the same travels straightly only to a partial area that is perpendicular to the light source unit.

The light-collecting lens 229 may have a polygonal section, as arranged on the left side of FIG. 3C, or may have an elliptical/circular section, as illustrated on the right side thereof, but is not limited thereto, and may also have a different shape as long as the same can collect light, which has a large emission angle, into a predetermined area and then emit the light.

The light-collecting lens 229 may be made of a synthetic resin material, such as polyethylene terephthalate (PET), polyethylene naphthalate, polymethylmethacrylate (PMMA), polycarbonate, polystyrene, polyolefine, cellulose acetate, polyvinyl chloride, or the like.

On the other hand, the diffuser plate 240, which constitutes the backlight unit, is arranged on the upper side of the side bent portion of the cover bottom, and has a function of diffusing light that is reflected from the reflecting plate 230.

The diffuser plate 240 according to the present embodiment also has a support function of supporting the optical sheet 250, which is arranged on the upper portion thereof.

In the case of the general structure as illustrated in FIG. 1A, the light guide plate supports the optical sheet on the upper portion thereof, requiring no diffuser plate; however, in the case of the backlight unit according to the present embodiment, which has no light guide plate, a diffuser plate 240, which is a plate-shaped member, is additionally used to support the film-type optical sheet portion 250.

The diffuser plate 240 may be made of at least one kind of light-transmitting material selected from polymethyl methacrylate (PMMA), MS (methlystylene) resin, polystyrene (PS), polypropylene (PP), polyethylene terephthalate (PET), and polycarbonate (PC).

In order to improve the light-diffusing characteristics of the diffuser plate 240, multiple diffusing patterns may be formed on a part of the surface of the diffuser plate; the diffusing patterns may be formed only in a partial area that corresponds to the light source or may be formed throughout the entire rear surface of the diffuser plate.

Particularly, as will be described in connection with following embodiments with reference FIG. 6 and following drawings, the diffuser plate according to the present embodiment may include, besides the above-mentioned diffusing patterns, a light-absorbing pattern that is coated with black or gray ink such that, by absorbing a part of the light from the light-input portion, the light distribution becomes uniform throughout the entire display device.

The light-absorbing pattern will be described later in more detail with reference to FIG. 6 and following drawings.

In addition, the diffuser plate 240 may include multiple scattering particles therein, in order to widely diffuse incident light. The scattering particles may have bead shapes, and the shape, size, and distribution of the scattering particles may be regular or irregular.

An optical sheet portion 250 may be additionally arranged on the upper portion of the diffuser plate 250, the optical sheet portion 250 including a combination of multiple individual optical sheets configured such that, by collecting light that has passed through the diffuser plate, a more uniform surface light source is incident.

The optical sheet portion 250 according to the present embodiment may include two or more individual sheets; examples of the individual sheets may include various kinds of functional sheets, such as a light-collecting sheet or a prism sheet (PS) that has a light-collecting function, a diffuser sheet (DS) that diffuses light, and a reflecting polarized film for improving luminance, which is referred to as a DBEF (dual brightness enhancement film), but are not limited thereto.

More specifically, the optical sheet portion 250 according to the present embodiment may be made of three individual sheets including, starting from the lower portion, a D-sheet, a prism down sheet, and a prism up sheet.

A light-absorbing pattern, which is coated with black or gray ink, may be additionally formed on a surface of the D-sheet, which is arranged on the lowermost portion of the optical sheet portion 250, such that, by absorbing a part of light from the light-input portion, the light distribution becomes uniform throughout the entire display device; this will be described later in more detail with reference to FIG. 6 and following drawings.

Normally, the light-collecting sheet, among the functional individual sheets that constitute the optical sheet portion 250, includes a predetermined light-collecting pattern and the like on a transparent film-type sheet, and thus has a light-collecting function of collecting incident light in a predetermined direction.

The diffuser sheet (D-sheet), which diffuses light, is an optical sheet that has a function of diffusing incident light in various directions, and may include a predetermined diffusing pattern or diffusing particles on a transparent film-type sheet.

The reflecting polarized film is an optical film that transmits only light that vibrates in one direction, among natural light that is incident while vibrating in various directions, and reflects light that vibrates in the other directions; and is used in such a concept that includes a luminance improving film referred to as DBEF (dual brightness enhancement film).

The cover bottom 310 constitutes the rear surface of the display device according to the present embodiment, the exterior of the side surface thereof, and the support portion thereof; and the cover bottom 310 is a frame structure made of a metallic or plastic material and has such an overall shape that the same has bent portions provided on both sides thereof and bent in U-shapes and has a flat portion 312 and a sloping portion 314 provided on the rear surface thereof so as to correspond to the flat surface 232 and the sloping surface 234 of the reflecting plate 230, respectively.

The guide panel 330 is a frame structure made of a plastic material, which is bent in an L-shape as a whole, and includes a side surface portion, which extends vertically so as to surround the outside of the side wall of the cover bottom 310, and a horizontal support portion, which extends horizontally and is integrated with the side surface portion.

A display panel 340 is seated on the horizontal support portion of the guide panel 330.

The cover bottom 310, as used herein, is not limited to the terminology, and may be denoted by other expressions, such as a plate bottom, a base frame, a metal frame, a metal chassis, a chassis base, and an m-chassis; therefore, the cover bottom 310 is to be understood as including any type of frame or plate-shaped structure, which is a support body that fixes at least one of the display panel and the backlight unit, and which is arranged on the bottommost part of the display device.

The guide panel 330, as used herein, may be denoted by a different expression such as a plastic chassis, a p-chassis, a support main, a main support, or a mold frame, and is to be understood as including any type of plastic member, which is a quadrangular frame-shaped structure having such a sectional shape that there are multiple bent portions, and which is connected to the cover bottom 310 and used to support the optical sheet, the display panel, and the like of the backlight unit.

The guide panel 330 may be fabricated in an injection molding type using a synthetic resin mold material, such as polycarbonate, but is not limited thereto.

A case top 350 may be additionally included, which extends from the side surface of the guide panel 330 to a part of the front surface of the display panel in order to protect a part of the front surface of the display panel.

The display panel 340, which is seated on the horizontal support surface of the guide panel 330 according to the present embodiment, may include, in the case of a liquid crystal display panel, multiple gate lines, multiple data lines, and pixels defined in areas of intersection therebetween; an array substrate including thin film transistors, which are switching elements for adjusting the degree of light transmittance at respective pixels; an upper substrate having a color filter and/or black matrix; and a liquid crystal substance layer formed therebetween.

In the present specification, the term "display device" is used as a concept including not only a display device, such as a liquid crystal module (LCM) that includes a display panel and a driving unit for driving the display panel, but also a set electronic device or a set device, which is a final product including such an LCM, including a television set, a computer monitor, and a mobile electronic device such as a smartphone or an electronic pad.

In other words, the display device, as used herein, is meant to include not only a display device, such as an LCM, but also a set device, which is an applied product including the same.

In addition, the display panel that can be used for the display device according to the present embodiment is not limited to the above-mentioned liquid crystal display panel, and may include all types of display panels that receive light from the backlight unit and output images.

Figure 4A:
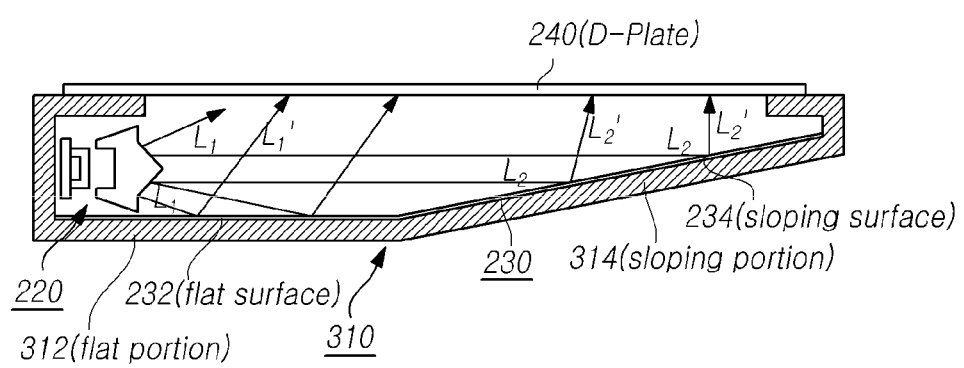
FIG. 4A and FIG. 4B are diagrams illustrating the relationship between a flat surface and a sloping surface of a reflecting plate of FIG. 2, and optical paths.
Figure 4B:
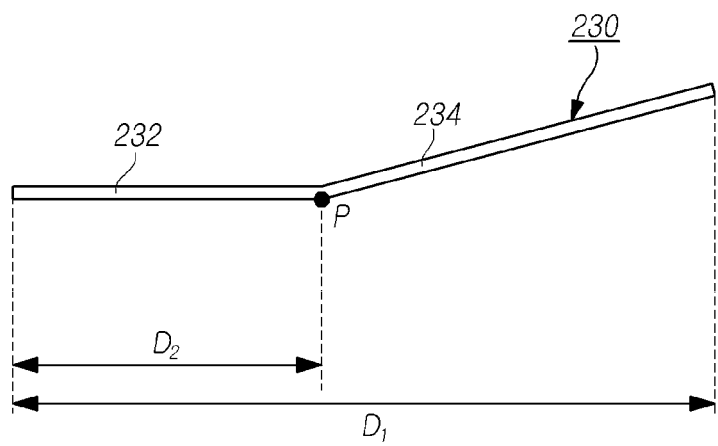
Figure 5:
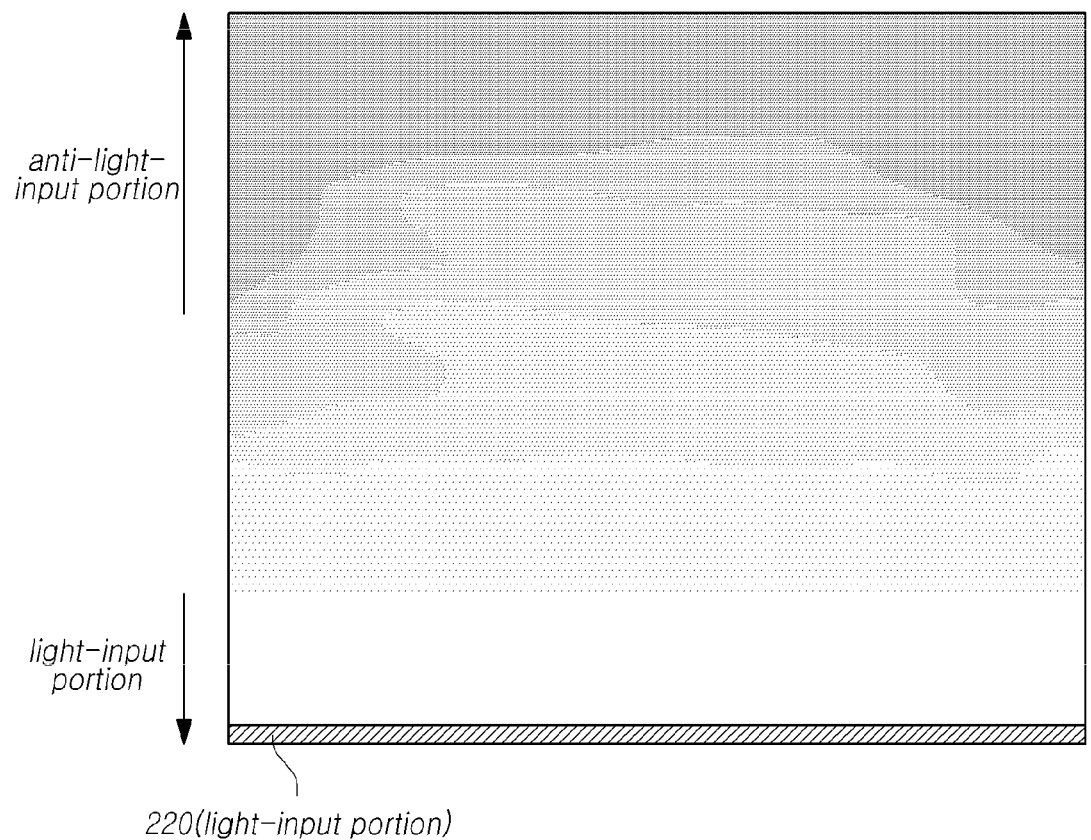
FIG. 5 illustrates light distribution throughout the entire display device when the backlight unit according to the embodiment of FIG. 2 is used.

FIGS. 4A and 4B are diagrams illustrating the relationship between a flat surface and a sloping surface of a reflecting plate used in the embodiment of FIG. 2, and optical paths. FIG. 5 illustrates light distribution throughout the entire display device when the backlight unit according to the embodiment of FIG. 2 is used.

As illustrated in FIGS. 4A and 4B, in connection with the display device according to the embodiment of FIG. 2, light, which emitted from the light source unit 220, is basically reflected at the reflecting plate 230 and is provided towards the display panel.

In connection with the light-input portion, which is adjacent to the light source unit 220, strong light is reflected by the flat surface 232 of the reflecting plate 230 and is directed towards the display panel; the amount of transferred light decreases as the same comes closer to the anti-light-input portion; therefore, a sloping surface 234 is used such that straightly traveling light is directed towards the display panel.

For example, in connection with the light-input portion, a part of strong light L1, among light emitted from the light-collecting lens 229, is reflected at the flat surface 232 of the reflecting plate 230 and is obliquely directed towards the display panel (L1'); on the anti-light-input portion side, light L2, which has been transferred a long distance thus has a reduced amount of light, is reflected at the sloping surface 234 of the reflecting plate 230 and is additionally vertically incident on the display panel.

As such, the sloping surface 234 of the reflecting plate 230 is used to change the path of light, at a place far from the light source unit 220, towards the display panel, thereby increasing the amount of light that is incident on the display panel near the anti-light-input portion.

FIG. 4B illustrates the position of formation of the sloping surface 234, and the length D2 of the flat surface preferably corresponds to 40-55% of the entire length D1 of the reflecting plate.

In other words, assuming that the point, at which the flat surface 232 that starts from the light-input portion ends, and from which the sloping surface 234 starts, is marked P, the distance D2 from the end of the reflecting plate 230, near the light-input portion, and the point P preferably corresponds to 40-55% of the entire length D1 of the reflecting plate.

For example, when the display device has a diagonal length of 55', the entire length of the reflecting plate (corresponding to the vertical size or height of the display device), D1, is about 685 mm, and, in this case, the length of the flat surface (i.e., distance from the end near the light-input portion to the sloping surface starting point P), D2, is about 280-380 mm.

It has been confirmed that, when the length D2 of the flat surface of the reflecting plate 230 corresponds to about 40-55% of the entire length D1 of the reflecting plate, the difference in the amount of light that is directed towards the display panel, between the light-input portion and the anti-light-input portion, is smallest.

However, the display device according to the embodiment of FIG. 2 may still has a limitation in that, even if the position or area of the sloping surface of the reflecting plate is adjusted as above, the amount of light at the light-input portion may be larger than the amount of light at the anti-light-input portion.

That is, as illustrated in FIG. 5, at the light-input portion, on which the light source unit 220 is arranged, strong light is emitted towards the display panel, while, on the anti-light-input portion side, relatively weak light is emitted towards the display panel, possibly making the light distribution throughout the entire display device uneven.

Accordingly, another embodiment of the present invention, as will be described below, proposes a scheme of forming a light-absorbing pattern, which can absorb a part of light, on at least one of the reflecting plate, the diffuser plate, and the optical sheet portion such that the light distribution becomes uniform throughout the entire display device.

Figure 6:
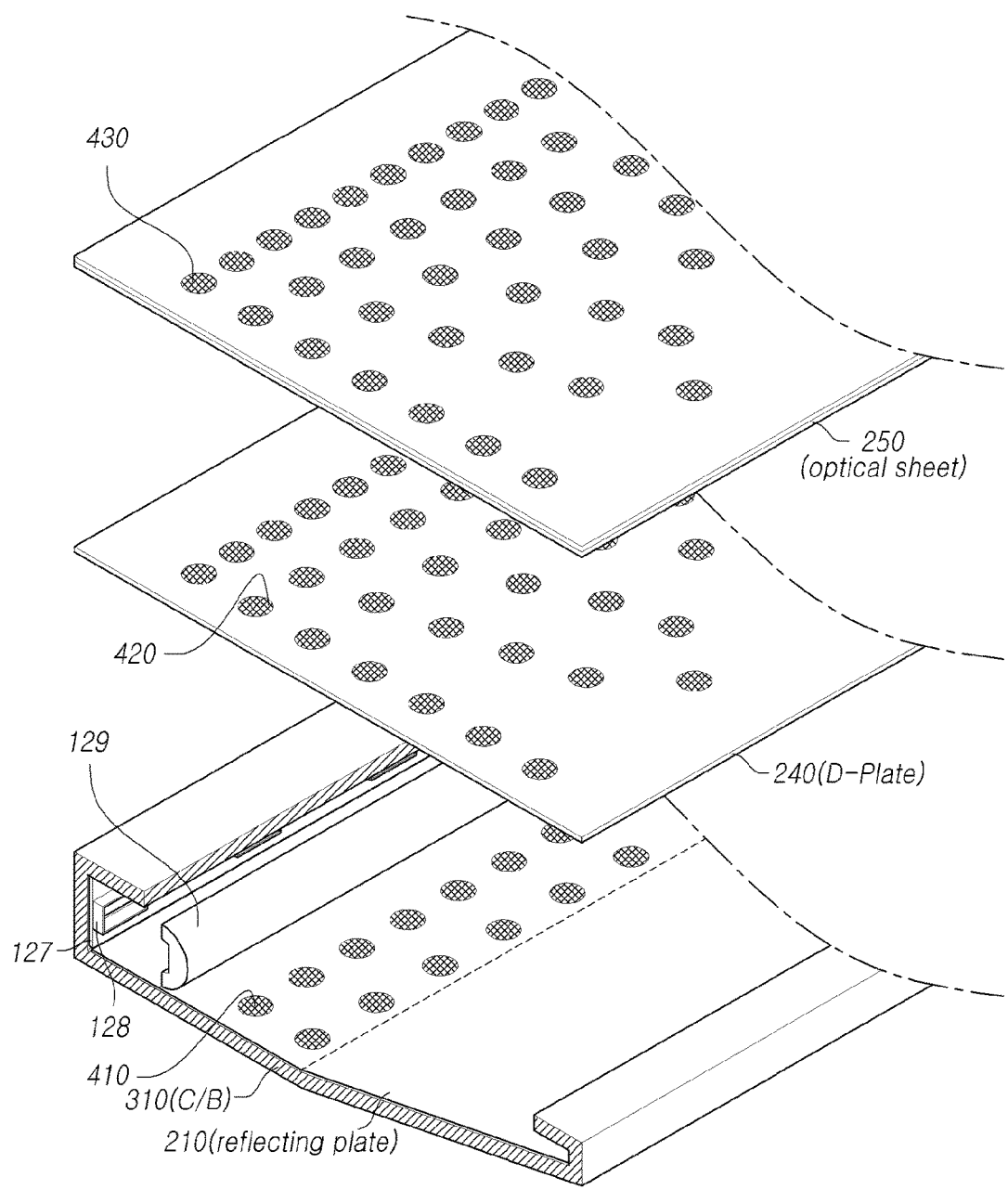
FIG. 6 is a partially exploded perspective view of a backlight unit and a display device including the backlight unit, according to another embodiment of the present invention.

FIG. 6 is a partially exploded perspective view of a backlight unit and a display device including the backlight unit, according to another embodiment of the present invention.

The display device according to the embodiment of FIG. 6 has basically a similar configuration to that of the display device according to the embodiment of FIG. 2, except that a light-absorbing pattern is formed; therefore, the following description will be focused on differentiated features.

The backlight unit of the display device according to the embodiment of FIG. 6 also is structured to have no light guide plate, and may include a light source unit 220 including a light source PCB 227 mounted on at least one side of the display device, a light source portion 228 mounted on the light source PCB, and a light-collecting lens 229 arranged in front of the light source chip in order to reduce the directing angle of light, which is incident from the light source portion, and then to collect the light; a reflecting plate 230 for reflecting the light from the light source unit towards the front surface of the display panel; a diffuser plate 240 arranged to be spaced from the reflecting plate, thereby diffusing light from the reflecting plate; an optical sheet portion 250 arranged on the upper portion of the diffuser plate; and the like.

The reflecting plate 230 includes a flat surface 232, which extends in parallel with the display panel from the light-input portion, and a sloping surface 234, which slopes from the flat surface towards the display panel so as to have a predetermined sloping angle.

According to the embodiment of FIG. 6, at least one light-absorbing pattern 410, 420, 430 is formed on a surface of the reflecting plate 232, the diffuser plate 240, the optical sheet portion 250, and the like.

More specifically, a light-absorbing pattern 410 may be formed on a part of the upper surface of the reflecting plate 230; a light-absorbing pattern 420 may be formed on the bottom surface or upper surface of the diffuser plate 240; and a light-absorbing pattern 430 is formed on the bottom surface of a D-sheet, which is arranged on the bottommost one of individual sheets that constitute the optical sheet portion 250.

The light-absorbing patterns have the function of absorbing a part of light, which is emitted from the light source, and reducing light that is reflected towards the display panel, and may be formed using color ink that has a black or gray tone.

The light-absorbing patterns 410, 420, and 430 are preferably formed such that the arrangement density is largest near the light-input portion and decreases towards the anti-light-input portion.

Figure 7A:
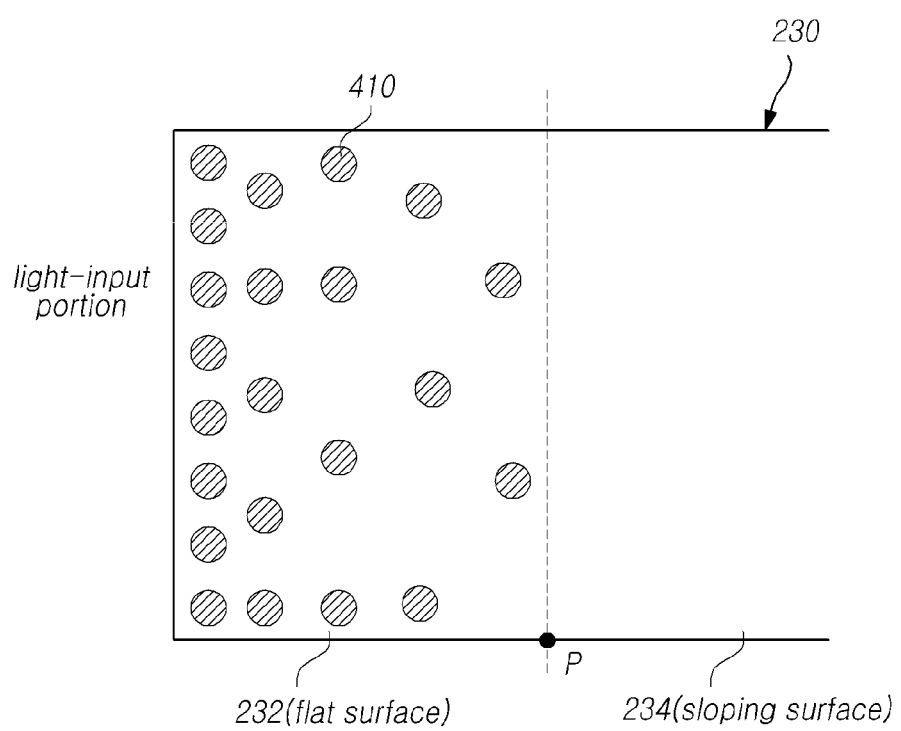
FIG. 7A and FIG. 7B illustrate the position of formation of a light-absorbing pattern, which is formed on at least one of an optical sheet, a diffuser plate, and a reflecting plate, the density of arrangement thereof, and the configuration of a slit-type light-absorbing pattern.
Figure 7B:
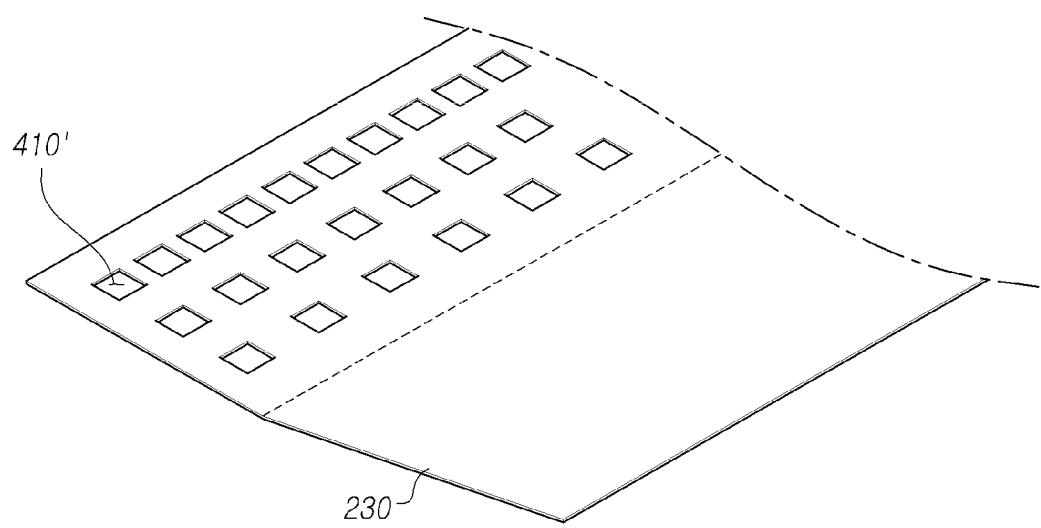

The light-absorbing pattern formed on the reflecting plate will now be described as an example. As illustrated in FIGS. 7A and 7B, the number of light-absorbing patterns or the size of the light-absorbing patterns is made large near the light-input portion, among the entire area of the reflecting plate 230, thereby increasing the density of arrangement of the light-absorbing pattern; and the density of arrangement of the light-absorbing pattern is decreased towards the anti-light-input portion.

The area of arrangement of the light-absorbing pattern may be limited to the flat surface area, in the case of the reflecting plate, and may be limited to a flat area of the diffuser plate or the optical sheet, to which the flat surface of the reflecting plate is projected, in the case of the diffuser plate and the optical sheet.

For example, as illustrated in FIG. 7A, a light-absorbing patterns 410 are formed in circular dot shapes only on the flat surface 232 of the reflecting plate 230; the number of light-absorbing patterns is increased near the light-input portion, thereby making the density of arrangement of the light-absorbing patterns high; and the number of the patterns is decreased in proportion to the distance from the light-input portion, thereby lowering the density of arrangement of the light-absorbing patterns.

The light-absorbing patterns 410 are preferably formed only on the flat surface 232 of the reflecting plate 230, and not formed on the sloping surface 234 thereof.

As illustrated with reference to FIGS. 4A and 4B, in the case of a backlight, which has no light guide plate, and which includes a reflecting plate that has a sloping surface, the amount of light directed towards the display panel is increased using the sloping surface on the anti-light-input portion side, but the amount of light near the light-input portion is larger; as a result, the overall light distribution is stronger near the light-input portion.

Therefore, the light-absorbing patterns 410 arranged near the light-input portion of the reflecting plate 230 and the like absorb a part of light near the light-input portion and reduce the amount of light near the light-input portion such that the amount of light becomes uniform throughout the entire display panel.

Particularly, the density of arrangement of light-absorbing patterns is made largest near the light-input portion; the density of arrangement is decreased towards the anti-light-input portion; light-absorbing patterns are formed only on the flat surface of the reflecting plate, which has a flat surface and a sloping surface, or in an area of the diffuser plate/optical sheet portion, which corresponds thereto; accordingly, the amount of light directed towards the display panel is decreased near the light-input portion, eventually making it possible to provide uniform light throughout the entire display panel.

Figure 8A:
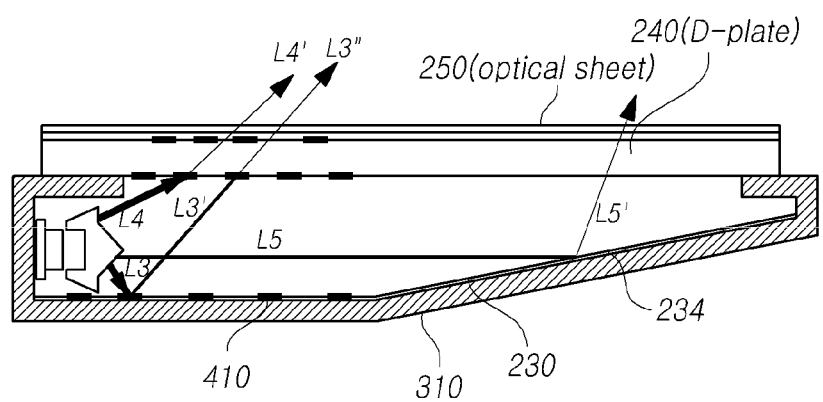
FIG. 8A and FIG. 8B illustrate an optical path, when the light-absorbing pattern according to the embodiment of FIG. 6 is used, and the light distribution throughout the entire display device.
Figure 8B:
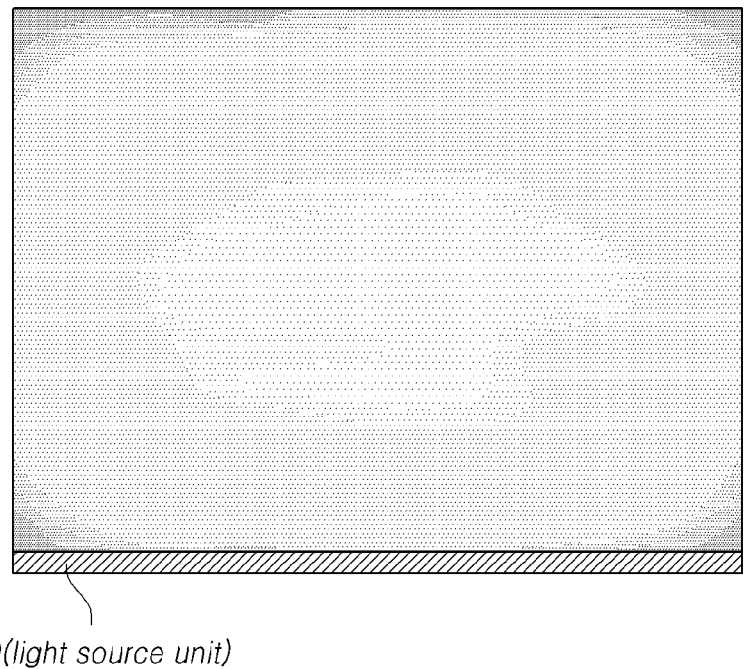

FIG. 8A and FIG. 8B illustrate an optical path, when the light-absorbing pattern according to the embodiment of FIG. 6 is used, and the light distribution throughout the entire display device.

As illustrated in FIG. 8A, among light emitted from the light source unit, initial strong light L3, which is directed from the light-input portion to the reflecting plate, is partially absorbed by the light-absorbing patterns 410 of the reflecting plate 230, and then is reflected; as a result, first reflected light L3', which is weaker than the initial light L3, is incident on the diffuser plate 240.

The first reflected light L3' is again partially absorbed by the light-absorbing patterns 420 on the diffuser plate 240, the light-absorbing patterns 430 formed on the optical sheet portion 250, and the like; and weak emitted light L3" is finally incident on the display panel.

Furthermore, among light emitted from the light source unit, initial light L4 that is directly directed from the light-input portion to the diffuser plate 240, is partially absorbed by the light-absorbing patterns 420 on the diffuser plate 240, the light-absorbing patterns 430 formed on the optical sheet portion 250, and the like; and weak emitted light L4' is finally incident on the display panel.

In contrast, the amount of light of straightly traveling light L5, among light emitted from the light source unit, decreases to some extent until the same reaches near the anti-light-input portion; after reaching the reflecting plate, the light is instantly absorbed by the sloping surface 234 of the reflecting plate 230, and is transferred to the display panel without being absorbed (L5').

Consequently, the intensity of light L3", L4', which is emitted to the display panel near the light-input portion by the light-absorbing patterns 410, 420, and 430 according to the present embodiment, and the intensity of light L5', which is emitted to the display panel near the anti-light-input portion, are almost identical, making it possible to provide uniform light throughout the entire display panel.

FIG. 8B illustrates a light profile throughout the entire display panel, when the embodiment of FIG. 6 is applied, and it is obvious therefrom that, unlike what is illustrated in FIG. 5, the light distribution is uniform throughout the entire display panel.

On the other hand, the light-absorbing patterns 410, 420, and 430 used in the present embodiment have no restriction regarding the shape and the size; any shape is possible, such as a circular dot pattern and a polygonal pattern.

Furthermore, the size of individual light-absorbing patterns is not limited as long as the density of arrangement of light-absorbing patterns can be made largest near the light-input portion and can be decreased away from the light-input portion.

For example, it is possible to use the same size of individual light-absorbing patterns as in FIG. 7A such that a larger number of individual light-absorbing patterns are formed in the unit area near the light-input portion; and it is also possible to form a constant number of individual light-absorbing patterns in the unit area such that a larger size of individual light-absorbing patterns are formed near the light-input portion.

It is also possible to form the light-absorbing patterns 240 on both surfaces of the diffuser plate 240 or only on the bottom or upper surface thereof.

The optical sheet portion 250 may be structured such that a D-sheet is laminated on the bottommost surface, and a P-DN sheet and a P-UP sheet are successively laminated thereon; in this case, the light-absorbing patterns are preferably formed on a surface of the bottommost D-sheet.

The light-absorbing patterns 410, 420, and 430 may be formed by coating or applying ink, which has a black or gray tone, in a pattern that has predetermined shape and size.

Any ink material, including black pigment, a binder, and the like, may be used as the light-absorbing pattern ink, which is used to form the light-absorbing patterns; the light-absorbing patterns may be formed by imprinting or printing the same, then curing the same, and fixing the same on the reflecting plate, the diffuser plate, or the optical sheet.

The light-absorbing pattern ink generally includes UV-curable ink, which is cured by UV rays, and IR-curable ink, which is cured by IR rays; according to the present embodiment, the two kinds of above light-absorbing pattern ink may be used.

The light-absorbing pattern ink composition according to the present embodiment may further include black pigment, a binder for securing the adsorbing property of the ink, a solvent or a dissolvent, various kinds of additives, and the like.

As the binder, acrylic copolymer may be used, which forms a printed paint film, and which has an acrylate group that can adjust the property of attachment of the light-absorbing patterns with regard to an attachment material, such as a reflecting plate; the present embodiment employs modified acrylate resin that has an optical refractive index of about 1.47.

The binder has thermally curable or UV-curable characteristics, and the material of the binder may be a polymer synthesized using one or at least two compounds selected from the group consisting of methyl methacrylate, ethyl acrylate, butyl methacrylate, butyl acrylate, styrene, and acrylic acid, but is not limited thereto.

The solvent or dissolvent is related to the overall viscosity of the light-absorbing pattern ink composition, and is used to adjust the workability when printing or imprinting light-absorbing patterns on the light guide plate; as a low boiling point solvent, benzene, toluene, xylene, methyl isobutyl carbitol, isobutyl acetate, normal butyl acetate, methyl isobutyl ketone, ethyl cellosolve, methyl cellosolve, or the like may be used; as a medium boiling point solvent, solvent, ethyl hexyl acetate, methoxybutyl acetate, cyclohexyl acetate, butyl cellosolve, butyl cellosolve acetate, cellosolve acetate, methyl carbitol, cyclohexanone, or the like may be used.

It is also possible to use a high boiling point solvent, such as dimethyl ether, butyl carbitol, dimethyl glutarate, dimethyl succinate, isoprene, carbitol acetate, ethylhexyl glycol, butyl carbitol acetate, ethyl carbitol, hexyl cellosolve, or the like.

The composition ratio of the solvent or dissolvent is preferably about 45-55 wt %; if the composition ratio exceeds 55 wt %, the viscosity of the ink may drop and cause spreading of the light-absorbing patterns; if the viscosity is less than 50 wt %, the relatively high viscosity may cause clogging of the plate during the printing or imprinting process.

The ink composition for the light-absorbing patterns according to the present embodiment may include other additives, such as a dispersing agent for properly dispersing the composition material or adjusting the viscosity, a leveling agent for improving the leveling property (paint film uniformity) of the ink paint film, a defoaming agent for destroying foam that may be generated during ink printing and suppressing foam generation, and a discoloring agent for preventing a color change.

The ink composition for light-absorbing patterns according to the present invention may be configured to have a gray tone, by adjusting the composition ratio of black pigment, and may further include diffusing beads for light diffusing, in the case of a gray-tone ink composition.

That is, when the light-absorbing patterns are formed in a gray tone, they absorb only a part of light and reflect the remaining light; the diffusing beads, which are included in the light-absorbing patterns, may diffuse the reflected light such that light, which is directed towards the display panel, becomes more uniform.

The diffusing beads included in the ink composition for light-absorbing patterns may be made of at least one material selected from PMMA, silica, and PC; the diffusing beads may have the shape of circular beads, pyramidal beads, or the like, but may also be formed in atypical shapes, i.e., having no specific shapes.

It is also possible to use at least two kinds of beads, which have different refractive indices and/or sizes, as the diffusing beads, depending on the case, in order to improve the diffusing performance and the light-absorbing performance. For example, the diffusing beads may include first diffusing beads, which have a diameter of 1-10 μm and a first refractive index, and second diffusing beads, which have a diameter of 20-80 μm and a second refractive index that is smaller than the first refractive index by 0.02-0.2. In this case, the desired light-absorbing performance can be secured by adjusting the density of distribution per unit volume of the first and second diffusing beads.

As another type of light-absorbing patterns used in the present invention, a predetermined part of the reflecting plate may be perforated to form bored slits, instead of using the ink for light-absorbing patterns.

That is, as illustrated in FIG. 7B, a predetermined part of the reflecting plate 230 may be perforated to form a light-absorbing pattern in the type of bored slits 410'; in this case, the density of formation of the bored slits 410' needs to be largest near the light-input portion, and the density of arrangement of the bored slits needs to decrease towards the anti-light-input portion.

The inner surface of the cover bottom, which has a relatively low refractive index, is arranged on the bottom surface of the reflecting plate; therefore, when bored slits 410' are formed on the reflecting plate 230, the inner surface of the cover bottom is partially exposed through the bored slits.

Therefore, light that is incident on the bored slits 410' is trapped inside the bored slits or is absorbed into the inner surface of the cover bottom, which is exposed through the bored slits, in particular; as a result, the light is not reflected towards the display panel; therefore, the bored slits function as light-absorbing patterns.

Using such bored slits 410' gives process-related advantages in that no process is required to form ink for light-absorbing patterns on the reflecting plate or the like, because bored slits can be formed together when the reflecting plate is fabricated.

The display device according to the embodiment of FIG. 6 may also include the same or similar remaining features of the display device according to FIGS. 4A and 4B.

For example, the reflecting plate 230 according to the embodiment of FIG. 6 has a flat surface 232 near the light-input portion and a sloping surface 234 near the anti-light-input portion, and the length D2 of the flat surface corresponds to 40-55% of the entire length D1 of the reflecting plate, thereby obtaining a uniform amount of light directed from the light-input portion and the anti-light-input portion towards the display panel.

As described above, according to an embodiment of the present invention, it is possible to provide a backlight unit including a reflecting plate, which is arranged on the inner surface of a cover bottom, and which has a sloping surface, and a light-collecting lens, which collects light from an edge light source portion, thereby having a slim structure with no light guide plate.

Particularly, in connection with an LGP-less backlight unit, which has the above structure, a light-absorbing pattern is arranged on at least one of an optical sheet, a diffuser plate, and the reflecting plate using such a configuration that the density of arrangement of the light-absorbing pattern is largest on a light-input portion and decreases towards an anti-light-input portion, or using such a configuration that the light-absorbing pattern is formed only on a flat surface of the reflecting plate, near the light-input portion, thereby providing uniform light throughout the entire display panel.

The above description and the accompanying drawings provide examples of the technical ideas of one or more embodiments of the present invention for illustrative purposes only. Those having ordinary knowledge in the technical field, to which the present invention pertains, will appreciate that various modifications and changes in form, such as combination, separation, substitution, and change of a configuration, are possible without departing from the essential features of the present invention. Therefore, the embodiments disclosed in the present invention are intended to illustrate the scope of the technical idea of the present invention, and the scope of the present invention is not limited by the embodiments. The scope of the present invention shall be construed on the basis of the accompanying claims in such a manner that all of the technical ideas included within the scope equivalent to the claims belong to the present invention.

What is claimed is:

1. A display device comprising:
    a display panel;
    a light source unit comprising a light source printed circuit board (PCB) mounted on at least one side of the display device, a light source portion mounted on the light source PCB, and a bar-type light-collecting lens configured to reduce a directing angle of light, which is incident from the light source portion, and to collect the light;
    a cover bottom supporting a rear surface of the display panel;
    a reflecting plate mounted on an inner surface of the cover bottom, the reflecting plate having a flat surface, which is parallel with the display panel, and a sloping surface, which slopes with regard to the flat surface;
    a diffuser plate arranged to be spaced from the reflecting plate in parallel with the display panel; and
    an optical sheet portion arranged on the diffuser plate, wherein a first light-absorbing pattern is arranged on a surface of the reflecting plate and a second light-absorbing pattern is arranged on the diffuser plate or the optical sheet portion, and wherein a density of arrangement of the first and second light-absorbing patterns is largest on a light-input portion and decreases towards an anti-light-input portion.

2. The display device of claim 1, wherein the flat surface of the reflecting plate is arranged on the light-input portion, which is adjacent to the light source unit, the sloping surface of the reflecting plate is arranged on the anti-light-input portion, which is spaced from the light source unit, and a length (D2) of the flat surface corresponds to 40-55% of an entire length (D1) of the reflecting plate.

3. The display device of claim 1, wherein an area of arrangement of the first light-absorbing pattern is limited to an area of the flat surface of the reflecting plate or an area of arrangement of the second light-absorbing pattern is limited to a flat area of the diffuser plate or the optical sheet, to which the flat surface of the reflecting plate is projected.

4. The display device of claim 1, wherein the first light-absorbing pattern arranged on the reflecting plate is a bored slit obtained by partially perforating the flat surface of the reflecting plate without penetrating all the way through the reflecting plate.

5. The display device of claim 1, wherein the first or second light-absorbing pattern includes light absorbing pattern ink, and wherein the light absorbing pattern ink includes diffusing beads for light diffusing.

6. The display device of claim 5, wherein the diffusing beads include first diffusing beads having a diameter of 1-10 μm and a first refractive index, and second diffusing beads having a diameter of 20-80 μm and a second refractive index smaller than the first refractive index by 0.02-0.2.

7. A backlight unit comprising:

a light source unit comprising a light source printed circuit board (PCB) mounted in an edge type, a light source portion mounted on the light source PCB so as to provide light to a display panel, and a bar-type light-collecting lens configured to reduce a directing angle of light, which is incident from the light source portion, and to collect the light;

a reflecting plate mounted on an inner surface of a cover bottom, which supports a rear surface of the display panel, the reflecting plate having a flat surface, which is parallel with the display panel, and a sloping surface, which slopes with regard to the flat surface;

a diffuser plate arranged to be spaced from the reflecting plate in parallel with the display panel; and an optical sheet portion arranged on the diffuser plate, wherein a first light-absorbing pattern is arranged on a surface of the reflecting plate and a second light-absorbing pattern is arranged on the diffuser plate or the optical sheet portion, and wherein a density of arrangement of the first and second light-absorbing patterns is largest on a light-input portion and decreases towards an anti-light-input portion.

8. The backlight unit of claim 7, wherein the flat surface of the reflecting plate is arranged on the light-input portion, which is adjacent to the light source unit, the sloping surface of the reflecting plate is arranged on the anti-light-input portion, which is spaced from the light source unit, and a length (D2) of the flat surface corresponds to 40-55% of an entire length (D1) of the reflecting plate.

9. The backlight unit of claim 8, wherein an area of arrangement of the first light-absorbing pattern is limited to an area of the flat surface of the reflecting plate or an area of arrangement of the second light-absorbing pattern is limited to a flat area of the diffuser plate or the optical sheet, to which the flat surface of the reflecting plate is projected.

10. The backlight unit of claim 8, wherein the light-absorbing pattern arranged on the reflecting plate is a bored slit obtained by partially perforating the flat surface of the reflecting plate without penetrating all the way through the reflecting plate.

11. The backlight unit of claim 7, wherein the first or second light-absorbing pattern includes light absorbing pattern ink, and wherein the light absorbing pattern ink includes diffusing beads for light diffusing.

12. The backlight unit of claim 11, wherein the diffusing beads include first diffusing beads having a diameter of 1-10 μm and a first refractive index, and second diffusing beads having a diameter of 20-80 μm and a second refractive index smaller than the first refractive index by 0.02-0.2.

* * * * *